United States Patent
Boelkins

[19]

[11] Patent Number: 6,062,248
[45] Date of Patent: May 16, 2000

[54] FLUID FLOW-SENSOR AND VALVE

[76] Inventor: Wallace G. Boelkins, 7107 Hidden Ridge Dr., Grand Rapids, Mich. 49506

[21] Appl. No.: 09/128,952

[22] Filed: Aug. 5, 1998

Related U.S. Application Data

[60] Provisional application No. 60/054,744, Aug. 13, 1997.

[51] Int. Cl.$^7$ .............................. F16K 37/00; F16K 15/14
[52] U.S. Cl. ...................... 137/118.02; 137/854; 137/557
[58] Field of Search .............................. 137/118.02, 102, 137/854, 516.17, 557

[56] References Cited

U.S. PATENT DOCUMENTS

| | | | |
|---|---|---|---|
| 3,807,445 | 4/1974 | McPhee | 137/557 |
| 3,835,878 | 9/1974 | Braidt et al. | 137/557 |
| 3,910,222 | 10/1975 | Metivier | 137/557 |
| 4,598,734 | 7/1986 | Moyes | 137/557 |
| 4,600,034 | 7/1986 | Ko | 137/557 |
| 4,921,008 | 5/1990 | Foster | 137/557 |
| 4,971,094 | 11/1990 | Gonzalez | 137/557 |
| 5,205,378 | 4/1993 | Boelkins | 184/55.1 |
| 5,507,318 | 4/1996 | Israelson | 137/854 |
| 5,524,729 | 6/1996 | Boelkins | 184/55.1 |
| 5,542,498 | 8/1996 | Boelkins | 184/7.4 |
| 5,860,449 | 1/1999 | Schulte | 137/854 |

*Primary Examiner*—Charles R. Eloshway
*Attorney, Agent, or Firm*—Price, Heneveld, Cooper, DeWitt & Litton

[57] ABSTRACT

A fluid flow-sensor and valve apparatus includes a housing having an inlet for receiving a fluid from a fluid supply and an outlet for dispensing the fluid. The housing includes at least one main passage communicating with the outlet for conveying the fluid thereto and at least one secondary passage communicating with the main passage for sensing fluid flow through the main passage. Within the housing, a valve is arranged for controlling the fluid flow through the main passage. The valve includes a resilient section that, in a dynamic condition, flexes in response to a pressure differential across it exceeding a predetermined "cracking pressure," to thereby permit fluid flow through the main passage. When the fluid pressure exceeds the "cracking pressure" and fluid flows through the main passage, a component of such fluid flow enters the secondary passage, as long as the pressure in the secondary passage is lower than the fluid pressure in the main passage, thus generating a fluid flow signal indicative of fluid flow through the main passage. Preferably, the valve is a one-piece resilient structure of the type known as an "umbrella valve," and the apparatus is embodied in a small, compact module which is removably mountable in a fluid flow-directing block or the like. The flow signal can be used for a variety of purposes including, for example, actuating a pump which dispenses liquid, e.g., lubricant or coolant, to an air tool or the like, in which embodiment the fluid flow through the apparatus may be the compressed air used to operate the air tool.

11 Claims, 2 Drawing Sheets

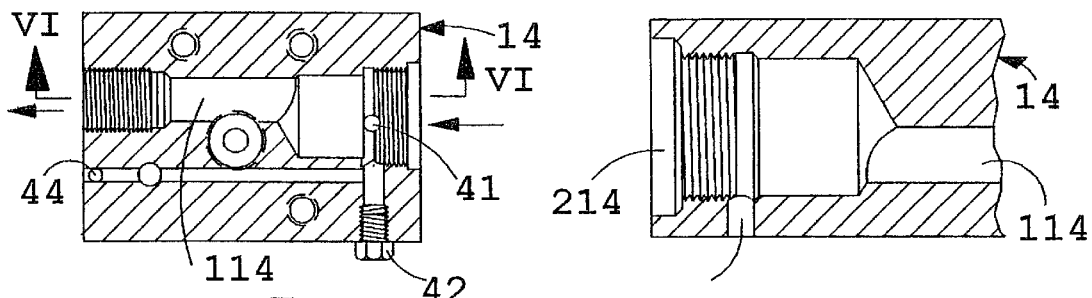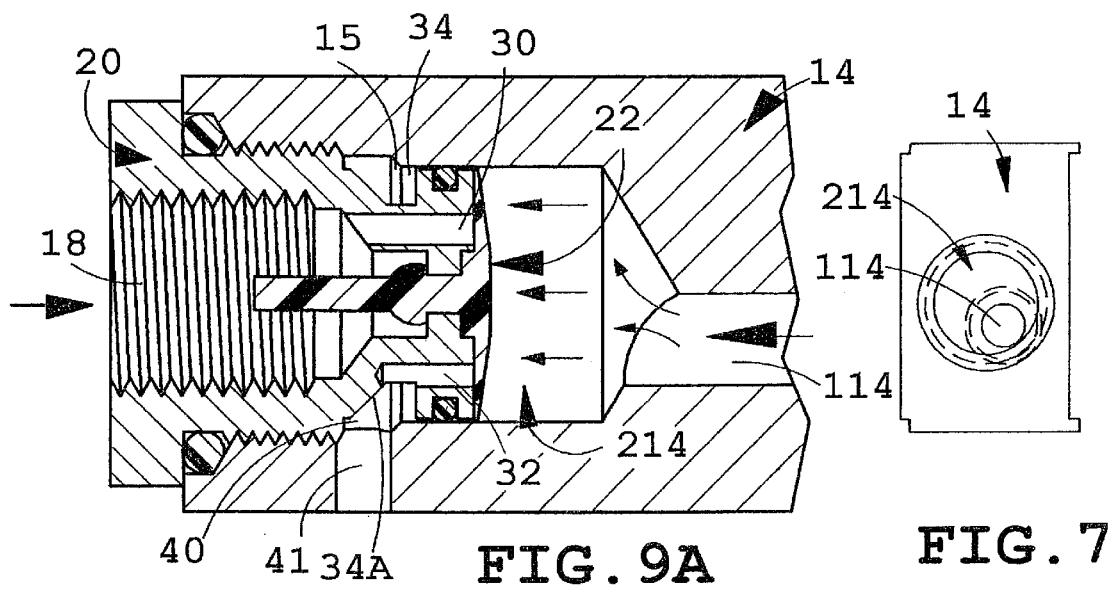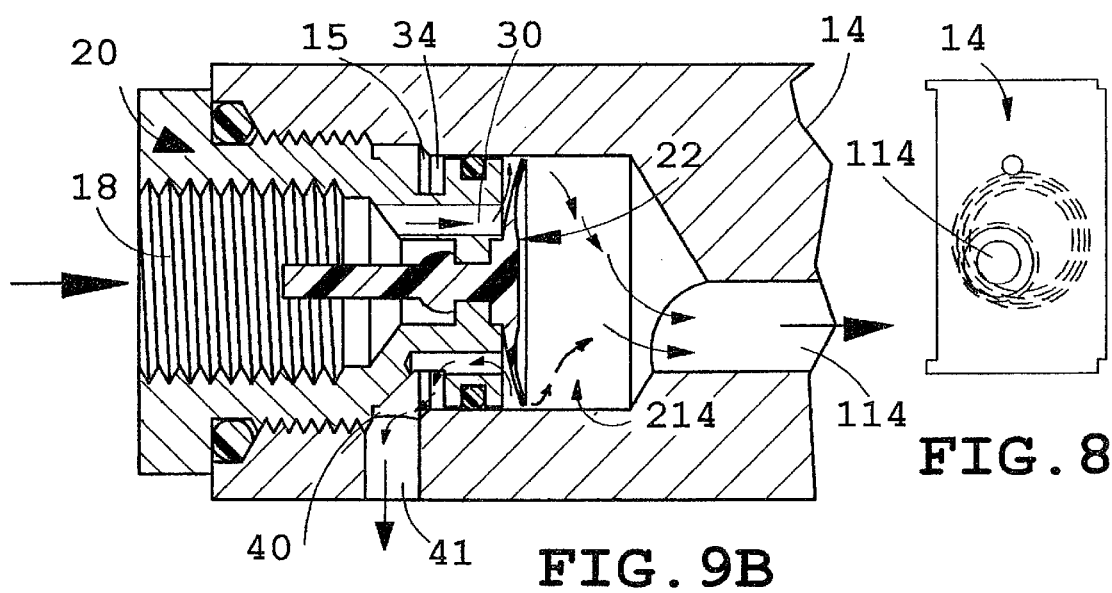

FLUID FLOW-SENSOR AND VALVE

CROSS-REFERENCE TO RELATED APPLICATION

This application claims priority under 35 U.S.C. § 119(e) on U.S. Provisional Application No. 60/054,744 entitled FLUID FLOW-SENSOR AND VALVE filed Aug. 13, 1997, by Wallace G. Boelkins, the entire disclosure of which is incorporated herein by reference.

This invention relates generally to fluid-handling and fluid flow-controlling apparatus, particularly as used in systems and apparatus for dispensing, applying, and otherwise utilizing fluids, in particular liquids. In a more particular sense, the invention relates to a novel type of fluid flow-sensor, and especially to such a sensor which includes a fluid-control valve and is implemented in the form of a small, self-contained module.

In a still more particular sense, and as an illustration of one particular field of application, the invention pertains to liquid metering and applicator apparatus, as for example those which are utilized in industrial and commercial applications to meter out and dispense lubricants and coolants, etc. As a particular example of equipment used in this field and in connection with which the present invention is particularly adapted for use, reference is made to Applicant's prior U.S. Pat. Nos. 5,205,378, 5,542,498, and 5,524,729, and also to the apparatus shown in Applicant's conventional application Ser. No. 08/888,577, filed Jul. 7, 1997, each of which is expressly incorporated herein by reference.

In systems and apparatus of the type noted above, the absence or presence of liquid or other fluid flow is a parameter of considerable importance, as is the timing of fluid flow commencement and discontinuation. Until now, apparatus for detecting and/or otherwise utilizing the onset and discontinuation of fluid flow have been of limited capability and applicability; in addition, such devices have characteristically been of a type involving a relatively large and bulky structure which is not suitable for direct integration into existing hardware or newly designed systems, in particular, systems having manifolding apparatus and small and compact systems of multiple output capability such as those toward which the above-listed patents and patent applications are directed. Basically, such prior flow-sensor devices have incorporated and utilized as a basic component a relatively large, rigid sensing, and valve-actuation disk which controls an attached valve and corresponding valve seat, to open and close, or modify fluid flow through the valve.

SUMMARY OF THE INVENTION

The present invention provides a new and more widely usable, as well as more highly adaptable, fluid flow-sensor device and module, which incorporates a new and different operating concept, has a small and compact size, is implemented as a small modular device that is directly usable as a flow-control system component, and which preferably incorporates or operates closely in conjunction with a valve apparatus.

In a preferred embodiment, the fluid flow-sensor and valve apparatus provided herewith include a housing having an inlet for receiving a fluid from a fluid supply, an outlet for dispensing the fluid, and at least one main passage extending through the outlet for conveying the fluid therethrough. In addition, the preferred apparatus includes at least one secondary passage extending through the outlet for sensing fluid flow through the main passage, the secondary passage extending in generally parallel and spaced relationship to the main passage. To control fluid flow through the system, a valving element is preferably arranged within the structure of the housing such that a portion of the valving element covers and generally seals the outlet in a static condition.

According to a further aspect of the fluid flow-sensor and valve, the valving element includes a resilient section that, in a static condition, normally blocks said outlet, and in a dynamic condition, flexes in response to a fluid pressure in the main passage that exceeds a predetermined "cracking pressure." In this latter state, the fluid propagates from the inlet, through the main passages and out of the outlet, for coupling to and use by a fluid-utilizing device. A resilient umbrella valve is preferably used for this purpose.

According to another aspect of the invention, when fluid is flowing in the main passage from the inlet through the outlet (i.e., in the dynamic condition) a component of the fluid flowing through the outlet enters the at least one secondary passage, as long as the pressure in the secondary passage is lower than the fluid pressure in the main passage. This component causes fluid flow through the secondary passage that extends in a direction generally opposite to the direction of fluid flow through the main passage, i.e., reverse sensing flow. The secondary passage intersects and communicates with an opening in the housing such that the fluid flow in the secondary passage comprises a flow signal indicative of fluid flow through the main passage. Notably, most commercially available umbrella valves do not permit reverse fluid flow and only operate as a check-valve to facilitate forward fluid flow when a threshold condition is met. The umbrella valve and associated structure of the present invention, on the other hand, allows fluid flow in opposite directions. The umbrella valve performs a check-valve function by preventing reverse fluid flow when the fluid pressure below the "cracking pressure," is not reached, but permits reverse fluid flow through the secondary passage when the fluid pressure is at or above the cracking pressure, such that the above-described novel flow-sensing function is realized.

According to a still further aspect of the invention, the component of the fluid passing through the secondary passage and associated opening is output to an air-utilizing apparatus for a variety of purposes. For example, this component can be used to actuate a pump that supplies a liquid through a pump passage to a pump outlet. Alternatively, the fluid flow through the secondary passage can be used to atomize the liquid supplied by the pump. For this use, the apparatus includes structure that conveys the fluid component in the secondary passage to the pump passage such that the component intersects and communicates with the liquid to atomize the liquid prior to use.

BRIEF DESCRIPTION OF THE DRAWINGS

FIG. 5 is a sectional view showing a preferred manifold body on a reduced scale compared to FIGS. 2, 3, and 4;

FIG. 6 is a fragmentary sectional view taken along the plane VI—VI of FIG. 5 but on a larger scale, showing only the left-hand portion of the FIG. 5 structure;

FIGS. 7 and 8 are opposite end views of the apparatus shown in FIG. 5, shown on the same scale as that figure; and FIGS. 9A and 9B are enlarged fragmentary, cross-sectional assembly views showing the combined structure of FIGS. 2A and 6, in static and dynamic conditions, respectively.

DETAILED DESCRIPTION OF PREFERRED EMBODIMENT

Figure 1:
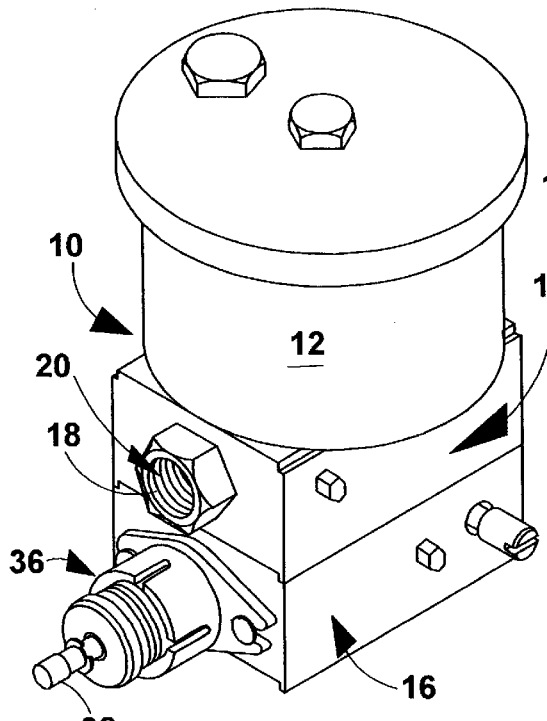
FIG. 1 is a perspective view of an exemplary system incorporating the fluid flow-sensor and valve module of the present invention.

With reference to the drawings, and particularly to FIG. 1, apparatus 10 includes a reservoir 12 for the fluid to be dispensed and applied, a manifold block 14 for conveying and distributing fluid from the reservoir 12 to desired pump modules, etc. The system as shown in FIG. 1 also includes a module 16 comprising a pump and distribution module for the liquid provided from the manifolding block 14, module 16 having an outlet on the end opposite that shown in FIG. 1, from which either single or coaxial lines extend to a desired point of application, depending upon the purposes to be served. As disclosed in the referenced patents, single-line systems convey a mixture of tiny liquid droplets and compressed air, whereas coaxial systems utilize independent coaxial tubes for dispensing liquid and compressed air.

A typical and exemplary application and use for the apparatus 10 shown in FIG. 1 is the supply of compressed air and/or lubricating fluid to an air-operated tool such as a drill or tapping device, etc. In such a use, the liquid in reservoir 12 would typically be a very lightweight oil mixture or composition, and the compressed air to be used for operating the tool would be supplied through an inlet aperture 18 in a fitting or housing 20 attached to an inlet port 214 (FIG. 6) of manifold 14, and an outlet port on the opposite end of the associated housing/manifold block 14. As disclosed in the referenced and incorporated patents and application, such compressed air is also typically or preferably used for other purposes as well, for example operating a pump apparatus 36 (which in the illustrated embodiment comprises a positive-displacement injector-type reciprocating pump of a known type), and also for atomizing the output volumes metered by the pump, all in a generally known manner, through the use of appropriate passages, conduits, etc.

In such a system, the utilization of conventional fluid flow-sensors of the type referred to above is doubtful and difficult at best, and potentially impossible, or at least impractical. Nonetheless, the presence and absence of compressed air flow to the operating tool is a parameter of considerable importance, which often needs to be known with sufficient certainty to require a flow-sensor. The present invention is particularly useful in such circumstances (although possessing considerable adaptability and additional usefulness).

Figure 2:
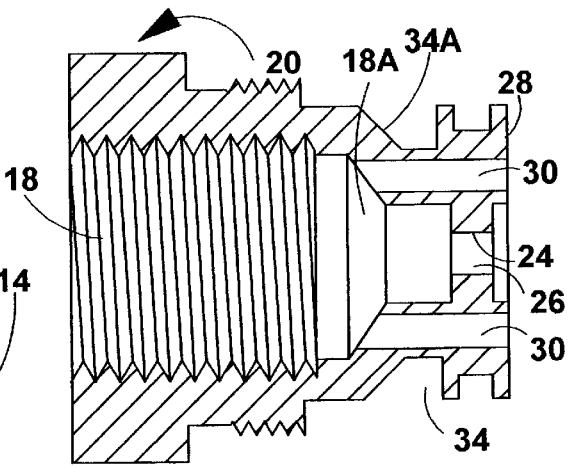
FIG. 2 is an enlarged cross-sectional view taken along the plane II—II of FIG. 4, showing the housing of the fluid flow-sensor module.
Figure 2A:
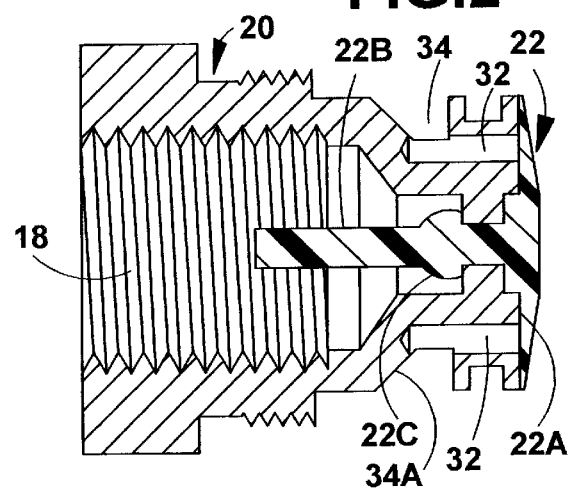
FIG. 2A is a cross-sectional view taken along the plane IIA—IIA of FIG. 4, showing the complete flow-sensor module including a valve element.
Figure 4:
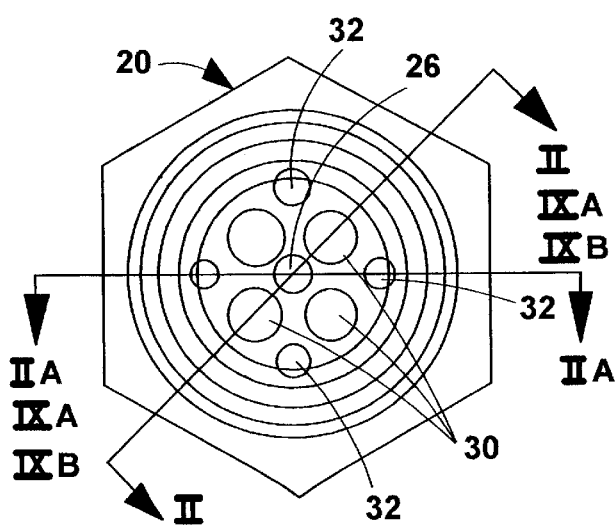
FIG. 4 is an end view of the housing as shown in FIG. 2 (as seen from the left)
Figure 3:
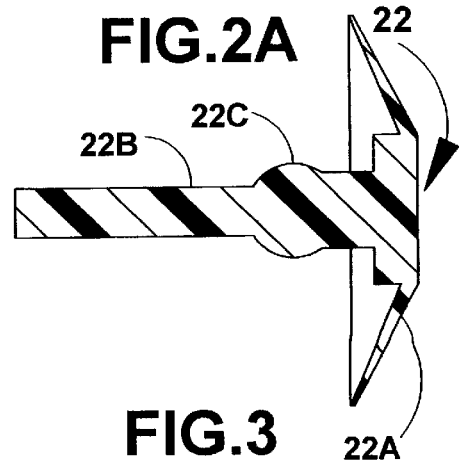
FIG. 3 is a central cross-sectional view similar to FIG. 2, showing the valve element of FIG. 2A in its relaxed state.

As better illustrated in FIGS. 2–4 inclusive, the fitting 20 actually comprises the body or housing for a flow-sensor module which incorporates a flow-sensing and valving element 22 (shown separately in FIG. 3). As illustrated in FIGS. 2A and 3, valving element 22 preferably comprises a molded resiliently flexible valve of a known type generally referred to as an "umbrella valve," ordinarily used as a check-valve, as for example is commercially available from Vernay Laboratories, Inc. of Yellow Springs, Ohio and identified by such company as its product number VA-3123.

The relative positioning and interfitting of valve 22 and body or housing 20 in their preferred state of assembly and in a static condition is best illustrated in FIG. 2A. Valve member 22 has an annular upper flange portion 22A which in a normal relaxed state (FIG. 3) is angularly disposed so as to form a generally concave umbrella-shaped upper extremity (FIG. 3), together with a central, coaxial stem portion 22B extending generally orthogonally to umbrella portion 22A. Stem portion 22B has a central knob-like enlargement 22C, which is used as a retaining means for valve 22 by locating portion 22C immediately below an annular internal shoulder 24 of body 20 which surrounds a central passage 26 (FIGS. 2 and 2A), through which the extending stem portion 22B is insertable to mount the valve 22 in the illustrated position. It is desirable to have the length of stem 22B above enlargement 22C be slightly less than the actual corresponding distance inside body 20 (i.e., the length of passage 26) so that at least a certain amount of resilient flexure, i.e., axial stretching or tension, is imposed on the upper part of stem portion 22B to seat the enlargement 22C beneath annular shoulder 24. Importantly, this stretching serves to resiliently draw the umbrella portion 22A down into an essentially flat disposition flush against an outer end surface 28 of body 20 (FIGS. 2A and 9A), thereby ensuring tight, resilient, sealing contact between the annular underside of the umbrella portion 22A and outer end surface 28 of body 20 in this static condition. In mounting the valve 22 in this manner, it will be appreciated that the lower or extended end portion of stem 22B provides a useful purpose by affording more ready purchase (grasping) of the valve member 22 for installing it in place and providing the aforementioned stretching, etc.

In the basic operation of the apparatus and overall system illustrated and disclosed, the supply of compressed air coupled to inlet aperture and passage 18 is to be communicated to the aforementioned air tool or other such utilizing device, and it is for this purpose that the series of passages 30 (FIGS. 2 and 4) are provided through body 20. As illustrated in FIG. 2, passages 30 extend through the end portion 28 of body 20 and communicate with the inner end extremity 18A of inlet passage 18 which, as illustrated, is preferably conically tapered to enhance air flow through passages 30. If the inlet air pressure applied at 18 is of sufficient magnitude in relation to the downstream pressure (i.e., above "cracking pressure"), the inlet pressure will act through the passages 30 to force the resilient annular periphery of umbrella portion 22A of valve member 22 outwardly and away from the outer end surface 28 of body 20, as shown in FIG. 9B, and this will allow free communication of the inlet air through the passages 30 and onward in a generally axial direction through passage 114, in effect connecting the applied pressure at inlet 18 to the air tool or other utilizing device.

In the foregoing regard, it will be understood that the particular resilient flexibility characteristics of valve member 22, and in particular its portion 22A, in conjunction with the levels of air or other fluid pressure involved, will have considerable importance in the way that umbrella portion 22A resiliently deflects and reseats in response to various levels and conditions of applied air pressure. Various different types and compositions of such valves are available, and some selectiveness may need to be exercised for a given set of conditions. In the particular embodiment described above, where applied pressure ranges from 80 to 110 psi and flow rates through the valve range between 5 and 40 S.C.F.M, the passages 30 may be on the order of one-eighth inch in diameter, the annular portion 22A of valve 22 on the order of one-half inch in diameter, and the valve made of the elastomer known as "Viton" with a Shore A durometer of 65 to 70, in a preferred embodiment. Other materials, which may give satisfactory results in a given situation, include flurosilicones and possibly BUNA-N or other Nitrile rubber.

The sequence of events and resulting air flow through passages 30 described above is contingent upon the presence of a pressure differential across valve member 22 and, in particular, its flexible, annular umbrella portion 22A. In systems of the type under discussion, this pressure differential results from actuation of the air tool, whereby the pressure downstream of valve 22 is lowered by actuation of the air tool and resulting depletion of the compressed air so provided. Of course, when the air tool or other such utilizing device is turned off, the pressure downstream of valve 22 becomes equal to the inlet pressure through passage 18, as illustrated in FIG. 9A by the left-facing arrows in passage 114. As a consequence, umbrella portion 22A will resiliently return to its seated position as shown in this figure, precluding air flow in either direction between the inlet and outlet unless and until there is a decrease in the downstream pressure.

In order to sense and utilize the occurrence of air flow through body 20 and valve 22 as noted above, novel structure is provided including a secondary set of passages 32 (FIGS. 2A, 4, 9A, and 9B), which are separate and distinct from the main axial passages 30. Secondary passages 32 are functional when flexible umbrella portion 22A becomes unseated from outer end surface 28 in the manner shown in FIG. 9B to permit axial air flow to the air tool or the like. When this happens, at least a small component of the air applied to the bottom of umbrella portion 22A and flowing under its raised perimeter may pass from the outer end extremity of the passages 30 (i.e., at the valve body extremity 28) into secondary passages 32, assuming that these passages are then under some lower pressure (e.g., that of atmosphere), less than that present at the adjacent ends of main passages 30, as typically will be the case.

As best illustrated in FIGS. 2A and 9A, the secondary passages 32 intersect and communicate with an annular recess or groove 34 in body 20, and the presence of pressurized air this recess is directly indicative of the presence of fluid flow past valve member 22 and through valve body 20. In addition, this air may be utilized for other purposes in accordance with this invention. For example, one particularly advantageous such other purpose is the actuation of the injector pump mentioned above, which is designated generally by the numeral 36 in FIG. 1 and is mounted in pump module 16 disposed below manifold block 14, which itself houses modular body and valve 20, 22, respectively. As described in the referenced and incorporated patents, such an injector pump may be actuated by air pressure as well as by mechanical force applied to an end portion 38 of its piston or piston-actuator.

The manner in which such flow-indicative air pressure is accessed and utilize in accordance with this invention is illustrated in FIGS. 5–9 inclusive (in particular, FIGS. 9A and 9B), from which it will be seen that the annular recess or groove 34 interconnecting secondary passages 32 communicates with a conical relief or undercut 15 in manifolding block 14 which leads to an annular undercut or relief 40, comprising part of a secondary channel for the passage of the air, whose presence is indicative of flow through valve body 20. Preferably, a rearward-facing wall 34A (FIG. 9A) of recess 34 is chamfered, as illustrated, to enhance fluid flow into and past relief 15 and undercut 40. In turn, annular undercut or relief 40 communicates with radially extending passages 41 and 42 which provide the secondary flow channel outlet and may lead to or be connected with the pump and distribution module 16 shown in FIG. 1. The configuration of such pump and distribution modules is shown in detail in the aforementioned referenced and incorporated other patents and application, but should be understood here as including a cooperative passage positioned in registration with passage 41 and leading to the pump chamber in module 16, in particular, to the internal chamber thereof in which the pump piston is made accessible for actuation by fluid pressure so communicated. Outwardly-opening passages such as 41 and 42 may be closed by a plug, as illustrated in FIG. 5, when not used or not desired to be left open.

In addition to use of the air pressure in the secondary air passage/channel referred to above, this flow-indicative air may be utilized for a number of other purposes, e.g., atomization of the liquid pumped by pump 36 each time air flow through valve 20 commences. The manner in which this may be accomplished is illustrated by a passage or conduit 44 in FIG. 5, as an example, which as shown opens outwardly through the end extremity of manifolding block 14 opposite that shown in FIG. 1 and alongside the main air flow passage 114 by which apparatus 10 is coupled to the air tool or other utilizing device. Passage 44 may be coupled to any desired air-carrying passage or device, as for example, by a tube leading away from apparatus 10, or may be connected (as through an indicated cross-passage 46 shown in FIG. 5) down to pump module 16 near the end extremity thereof where liquid is ejected by pump 36. From this point, the air may be further communicated to either a single-line outlet, in which the air is interspersed with distributed dispersions of the pumped liquid, or it may be connected into one of a pair of coaxial or other such lines or tubes.

As will be understood, additional passage 44 for the secondary air flow path may be useful for a number of different or additional purposes, but both it and passages 41 and 42 provide a signal indicating the advent and presence of fluid flow under pressure through valve module 20. Accordingly, this flow-indicating signal may be utilized for auxiliary purposes such as actuating a visual or audible indicator to show the presence of fluid flow through the primary flow passage 114, in addition to or in place of the more utilitarian purposes of pump actuation and liquid atomization just described. Of course, fluid pressure along the secondary or sensing paths 41, 42, 44 will be present so long as there is fluid flow past valve 22 and through main valve body 14 and passage 114, since the passages 30 and 32 are then in communication with each other; however, in the event such fluid flow through main passage 114 ends (as for example, by shutting off the air tool previously actuated), fluid pressure at the secondary passages 41, 42, 44 will terminate, at least to the extent that at least one of these or some other passage communicating with them is vented to atmosphere or some other lower pressure. Where air flow from passage 44 is utilized to atomize liquid metered by pump 36, this result will automatically be provided since the atomizing air line is in all probability open-ended, or at least partially open. Where venting or pressure relief is not provided in such a manner, passage 42 may be vented in any manner desired, such as for example through a bleed orifice (not specifically illustrated).

This lowering of pressure in the secondary or signal channel 41, 42, 44 is particularly important where the onset of pressure is used as a pulse to actuate the pump 36, as described above. In cases such as this, and where pump 36 is of the indicated injector-type, the pump will automatically reset for the next pulse, but only if the actuating pulse is released or removed; of course, venting will accomplish this. In this regard, it may be observed that relative passage sizes and resulting air or fluid flow restrictions may be an important design criteria, particularly if they amount to orifice restriction. For example, a very small-diameter bleed orifice could be used to provide a slower pressure release factor and thereby provide a timing or delay feature in pump operation, etc. Of course, as already stated, many other uses of the secondary or signal channel may be implemented and taken advantage of, both in systems of the general type described herein and in quite different installations as well. In systems of the type referred to herein, the air pressure from passage 42 may be used to operate a "pneumatic oscillator," or pulse generator, as referred to in certain of the incorporated and referenced prior patents, whereby a desired ongoing sequence of pulses may be obtained following the onset of a single pressure occurrence through main channel 114.

As will be apparent from the foregoing, a highly useful and novel flow-sensor device is provided which may be implemented as a very small, compact, and inexpensive module for use in fluid systems generally; at the same time, however, certain novel uses and examples of such uses are disclosed by which the flow-indicating signal may be used for other purposes as well. In addition to the flow-sensing characteristic the basic installation also provides a check-valve application, since umbrella portion 22A will firmly seat over main passages 30 to prevent reverse-flow in situations where that is a factor. In this regard, secondary channels 32, 34, 40, etc. help insure firm seating of valve portion 22A against face 28 of valve body 20, since they lower the pressure present at the end of passages 32, immediately below the flexible skirt or apron 22A, whereby downstream pressure will force the latter portion tightly against end extremity 28 (as shown in FIG. 9A).

The principal objectives, advantages, and salient features of the present invention will be apparent from the foregoing complete disclosure and comments contained therein. As will be evident, these include the provision of a new concept and structure for a fluid flow-sensor that may be implemented as a small, modular device which is directly integratable into existing manifold and pump housings such as those illustrated herein, as well as other such applications, particularly where (but not necessarily limited to) a flexible umbrella-like or other such valve element is utilized, and/or where the secondary flow-indicating fluid pressure or flow is utilized for additional purposes, related or otherwise. No doubt, a great many other such attributes are equally present and provided by the novel subject matter disclosed, which is subject to numerous modifications and variations. Consequently, all such modifications and variations are to be deemed within the scope of the following claims, construed in accordance with the doctrine of equivalents.

What is claimed is:

1. A fluid flow-sensor and valve comprising:
    a housing having an inlet for receiving a fluid from a fluid supply and an outlet for dispensing said fluid, said housing having at least one main passage for conveying said fluid to said outlet, and at least one secondary passage for communicating with said at least one main passage to sense fluid flow through said at least one main passage;
    a valve arranged on said housing for controlling fluid flow through said at least one main passage;
    said at least one secondary passage communicating with said at least one main passage inside said housing to receive a portion of the fluid flow therein, such that said portion of said fluid is indicative of fluid flow through said main passage, whereby said valve controls flow of said fluid portion into said at least one secondary passage; and
    a fluid-pressure responsive device connected to said at least one secondary passage to receive said fluid portion, said fluid-pressure responsive device including a pump having a pump passage leading to a pump outlet, said fluid portion for actuating said pump to produce a flow through said pump passage to said pump outlet.

2. A fluid flow-sensor and valve according to claim 1, wherein said fluid portion is conveyed through a passage communicating with said flow through said pump passage to mix with said flow through said pump passage.

3. A fluid flow-sensor and valve according to claim 1, wherein said valve has an umbrella portion and a stem portion extending generally orthogonally to said umbrella portion.

4. A fluid flow-sensor and valve according to claim 3, wherein said umbrella portion controls said portion of said fluid flowing in said main passage and intosaid secondary passage.

5. A fluid flow-sensor and valve according to claim 4, wherein at least said umbrella portion comprises a resilient elastomeric material.

6. A fluid flow-sensor and valve according to claim 5, wherein at least a portion of said stem portion comprises an elastomeric material.

7. A fluid flow-sensor and valve according to claim 6, wherein said umbrella portion and said stem portion comprise an integral one-piece member.

8. A fluid flow-sensor and valve according to claim 1, further including a plurality of said main passages for conveying said fluid, said main passages extending in generally parallel and spaced relationship.

9. A fluid flow-sensor and valve according to claim 1, further including a plurality of secondary passages for collectively sensing fluid flow through said at least one main passage, said plurality of secondary passages extending in generally parallel and spaced relationship to each other.

10. A fluid flow-sensor and valve comprising:
    a housing having an inlet for receiving a fluid from a fluid supply and an outlet for dispensing said fluid, said housing having a main passage communicating with said outlet for conveying said fluid thereto, and a secondary passage communicating with said main passage to sense fluid flow through it; and
    a valve arranged on said housing for controlling fluid flow through said main passage and said secondary passage, said valve comprising a resilient member that tapers radially from a center region thereof to the periphery of the member and normally closes said main and secondary passages but which radially flexes uniformly in response to a pressure differential across it exceeding a predetermined cracking pressure to thereby open both said main and said secondary passages together, whereby said fluid then flows from said inlet through said main passage to said outlet and also flows into said secondary passage to directly sense the flow through said main passage.

11. A fluid flow-sensor and valve according to claim 10, wherein said resilient valve member comprises a resiliently flexible skirt which normally extends across both said main passage and said secondary passage to close them, said skirt uniformly resiliently flexing to open said passages.

* * * * *